United States Patent Office 3,352,921
Patented Nov. 14, 1967

3,352,921
PROCESS FOR MAKING 2-HYDROXY-4 OR
5-ALKYLBENZOPHENONES USING SODI-
UM IODIDE
John Mather, Harrogate, England, assignor to Imperial
Chemical Industries Limited, London, England, a corporation of Great Britain
No Drawing. Filed Aug. 26, 1964, Ser. No. 392,322
Claims priority, application Great Britain, Sept. 20, 1963,
37,050/63
2 Claims. (Cl. 260—591)

This invention relates to the preparation of 2-hydroxy-4 or 5-alkylbenzophenones wherein the alkyl group is branched.

It is known to produce 2-hydroxy 5-alkylbenzophenones by means of the Friedel-Crafts reaction employing anhydrous aluminium chloride, the appropriately substituted phenol and benzoyl chloride as reactants. However if the phenol is substituted with a branched alkyl group it is found that this group is vulnerable under Friedel-Crafts conditions and the desired ketone is not produced or is produced as a minor component of the reaction mixture.

Alternative methods of producing substituted 2-hydroxybenzophenones are limited to the preparation of alkoxy-substituted derivatives and require at least a two-stage reaction involving expensive intermediates as for example resorcinal and a bromoalkane.

It is an object of the present invention to produce 2-hydroxy-4 or 5-alkylbenzophenones, wherein the alkyl group is branched, by a simple acylation reaction, in aqueous alkaline medium.

Thus according to the present invention we provide a process for the production of 2-hydroxy-4 or 5-alkylbenzophenones, wherein the alkyl group is branched, comprising reacting benzotrichloride with an m- or p-alkyl phenol, containing the required branched alkyl group, in aqueous alkaline medium, characterised in that the reaction is carried out in presence of an alkali metal iodide or bromide.

By means of the present invention the branched alkylhydroxybenzophenones become readily accessible and only readily available, comparatively cheap, raw materials are required, as for example the branched alkylphenols produced in quantity by the petrochemical industry.

The process of this invention is particularly adapted to the production of 2-hydroxy-4 or 5-alkylbenzophenones wherein the alkyl group is a branched chain having 6 to 24 carbon atoms which has been derived from an oligomer of propylene.

Also according to the present invention we provide 2-hydroxy-4 or 5-alkylbenzophenones wherein the alkyl group is a branched chain of 6 to 24 carbon atoms which has been derived from an oligomer of propylene.

Substituted benzophenones of the foregoing type are particularly adapted for use as ultraviolet absorbers in polypropylene, enhancing the resistance of the polymer to degradation by ultraviolet light.

The process may be carried out using water as the only solvent or it may be carried out in partially alcoholic medium; working-up of the reaction product is, however, facilitated if water alone is used.

The course of the reaction of benzotrichloride with the branched alkyl phenol is not fully certain but probably goes through the steps of acylation and hydrolysis as follows:

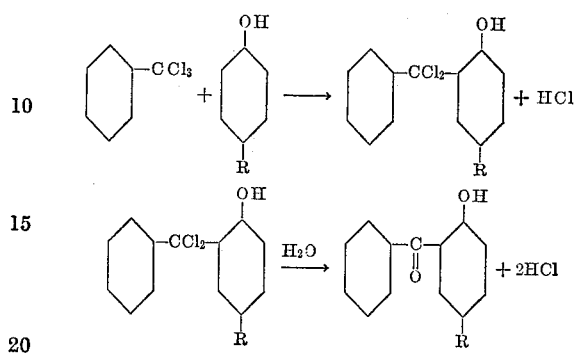

In these reactions R is a branched alkyl group containing 4 to 24 carbon atoms. The branched alkylhydroxybenzophenones of the present invention find use as ultraviolet light screens or absorbers, as for example in the stabilisation of polymeric substances subject to degradation by sunlight.

The reaction of benzotrichloride in alkaline medium with an m-alkyl phenol produces a mixture of hydroxyalkylbenzophenones. This mixture is useful as a UV absorber without separation.

By way of example one embodiment of the invention will now be described, wherein all parts are by weight. A comparative example is also given wherein the poorer yield obtained in the absence of alkali metal iodide is shown.

Example 1

Benzotrichloride (98 parts) is added dropwise over 1½ hours to a solution of p-1,1,3,3-tetramethyl-butyl phenol (103 parts) and sodium iodide (75 parts) in aqueous sodium hydroxide (650 parts of a 2.5 normal solution) with vigorous stirring and heating at 80° C. for a further 2½ hours after the addition is complete. Sodium hydroxide solution (80 parts of a 5 normal solution) is then added and the mixture is refluxed for 2 hours. The solution is cooled, acidified and extracted with ether. The ether extract is washed with sodium bicarbonate solution and water and then dried with anhydrous sodium sulphate. The yield of the product, 2-benzoyl-4-(1,1,3,3-tetramethylbutyl) phenol, is measured absorptionetrically using the extinction coefficient at the wavelength of maximum absorption (4550 and 350 mμ) of the compound purified by fractional distillation under reduced pressure (boiling point 140° C. at 1 mm. pressure). The yield is 39% of the theoretical.

Comparative example

The process of Example 1 is repeated omitting the sodium iodide from the reaction mixture. The yield of 2-benzoyl-4-(1,1,3,3-tetramethyl-butyl) phenol is reduced to 33% of the theoretical.

What I claim is:

1. In a process for the production of 2-hydroxy-4 or 5-alkylbenzophenones, wherein the alkyl group is branched and contains 4–24 carbon atoms, comprising reacting benzotrichloride with an m- or p-alkyl phenol containing the required branched alkyl group in aqueous alkaline medium, the improvement which comprises carrying out the reaction in presence of sodium iodide in an amount sufficient to increase the yield of said 2-hydroxy-4 or 5-alkylbenzophenones.

2. A process according to claim 1 wherein the medium is partially alcoholic.

References Cited

UNITED STATES PATENTS 3,000,856   9/1961   Newland et al. _____ 260—591

FOREIGN PATENTS 10,095   1890   Great Britain.

OTHER REFERENCES

Hamanda, Chemical Abstracts 27, 39283 (1933).

LEON ZITVER, *Primary Examiner.*

DANIEL D. HORWITZ, *Examiner.*